Jan. 4, 1949.　　　A. KALITINSKY ET AL　　　2,458,172
ASSEMBLY OF FREE-PISTON UNITS
Filed April 15, 1944　　　　　　　　　　2 Sheets-Sheet 1

INVENTORS
Andrew Kalitinsky
Walter A. Ledwith
Charles Allarsen
ATTORNEY

INVENTORS
Andrew Kalitinsky
Walter A. Ledwith
Charles Albersen
ATTORNEY

Patented Jan. 4, 1949

2,458,172

UNITED STATES PATENT OFFICE 2,458,172

ASSEMBLY OF FREE-PISTON UNITS

Andrew Kalitinsky, Eagleville, and Walter A. Ledwith, Hartford, Conn., assignors to United Aircraft Corporation, East Hartford, Conn., a corporation of Delaware Application April 15, 1944, Serial No. 531,305

3 Claims. (Cl. 230—56)

This invention relates to a free-piston engine-and-compressor unit.

When a unit of this type is made up of a central engine cylinder and opposed compressor cylinders, the manufacturing tolerances make difficult the alignment of the cylinders, especially when the compressor cylinders are connected directly to the engine cylinder. Alignment is even more difficult when the air springs at the outer ends of the compressor cylinders are mounted directly on the outer ends of the compressor cylinders. One feature of this invention is the alignment of the engine and the compressor cylinders by a separate supporting and aligning structure. Another feature is the alignment of the air springs from the same supporting structure.

An object of the invention is the support of the several elements of the unit from a single supporting structure which may form the basic load-carrying structure and which has its supporting and aligning surfaces so arranged as to permit machining of all of the surfaces during a single set-up of the structure in the machine tool.

A feature of the invention is a free-piston unit adapted for assembly without the necessity for separate alignment of each of the parts of the units during assembly. Another feature is a unit of this type which is adapted for endwise assembly.

One problem in units of this character is to maintain alignment of the parts during operation since the several parts of the unit operate at different temperatures and the alignment may be affected by the different rates of expansion in the various elements. A feature of this invention is the use of an external load-carrying housing which functions as an intake manifold and is thereby kept relatively cool, this housing being used to maintain the alignment of the several parts of the unit, thereby preventing misalignment resulting from differential expansion of the parts.

Other objects and advantages will be apparent from the specification and claims, and from the accompanying drawings which illustrate an embodiment of the invention.

Figure 1:
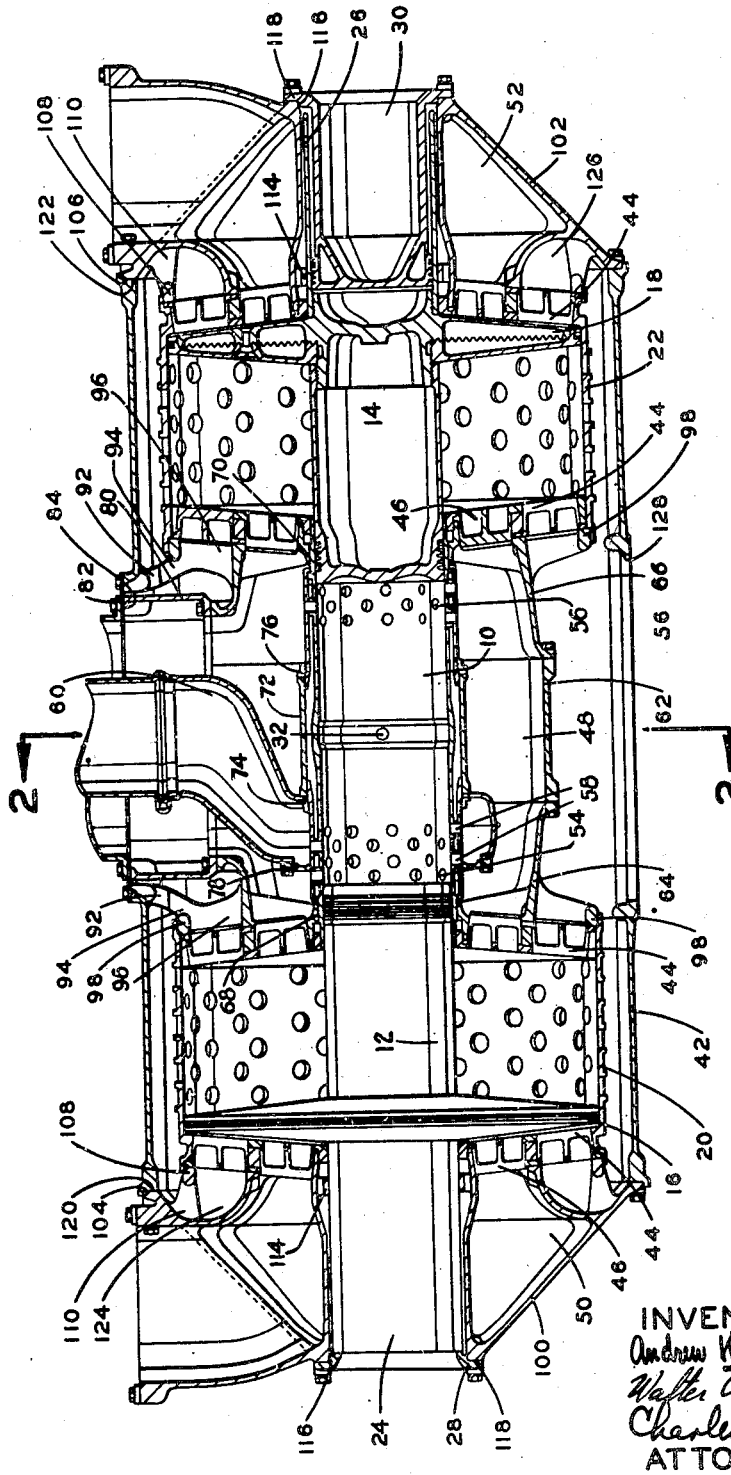
Fig. 1 is a sectional view through the unit.

The unit shown includes an engine cylinder 10 having reciprocating pistons 12 and 14 to which compressor pistons 16 and 18 in cylinders 20 and 22 are integrally connected. Sleeves 24 and 26 attached to the compressor pistons complete the reciprocating piston assemblies. The sleeves in combination with stationary pistons 28 and 30 form air spring cylinders.

The piston assemblies are moved apart by the burning of fuel injected into engine cylinder 10 through one or more nozzles 32. Air compressed in the air spring cylinders on the power stroke returns the piston assemblies. The assemblies are always maintained at equal distances from the center of the engine cylinder by a linkage, not shown.

A housing 42 forms an intake manifold which extends around the compressor and engine cylinders, conducts air to intake valves 44 in the heads of the compressor cylinders, through which air alternately enters opposite ends of the cylinders. The compressed air leaves the cylinders through discharge valves 46, also at opposite ends of the compressor cylinders and passes into a central scavenge manifold 48 and end scavenge chambers 50 and 52. These chambers may be interconnected by a scavenge duct, not shown.

Compressed gas from the scavenge chambers enters engine ports 54 and 56 which are uncovered by pistons 12 and 14 at the end of the power stroke, thereby permitting air to be blown through the engine cylinder. Gas in the engine cylinders is discharged through exhaust ports 58 into exhaust manifold 60.

Figure 2:
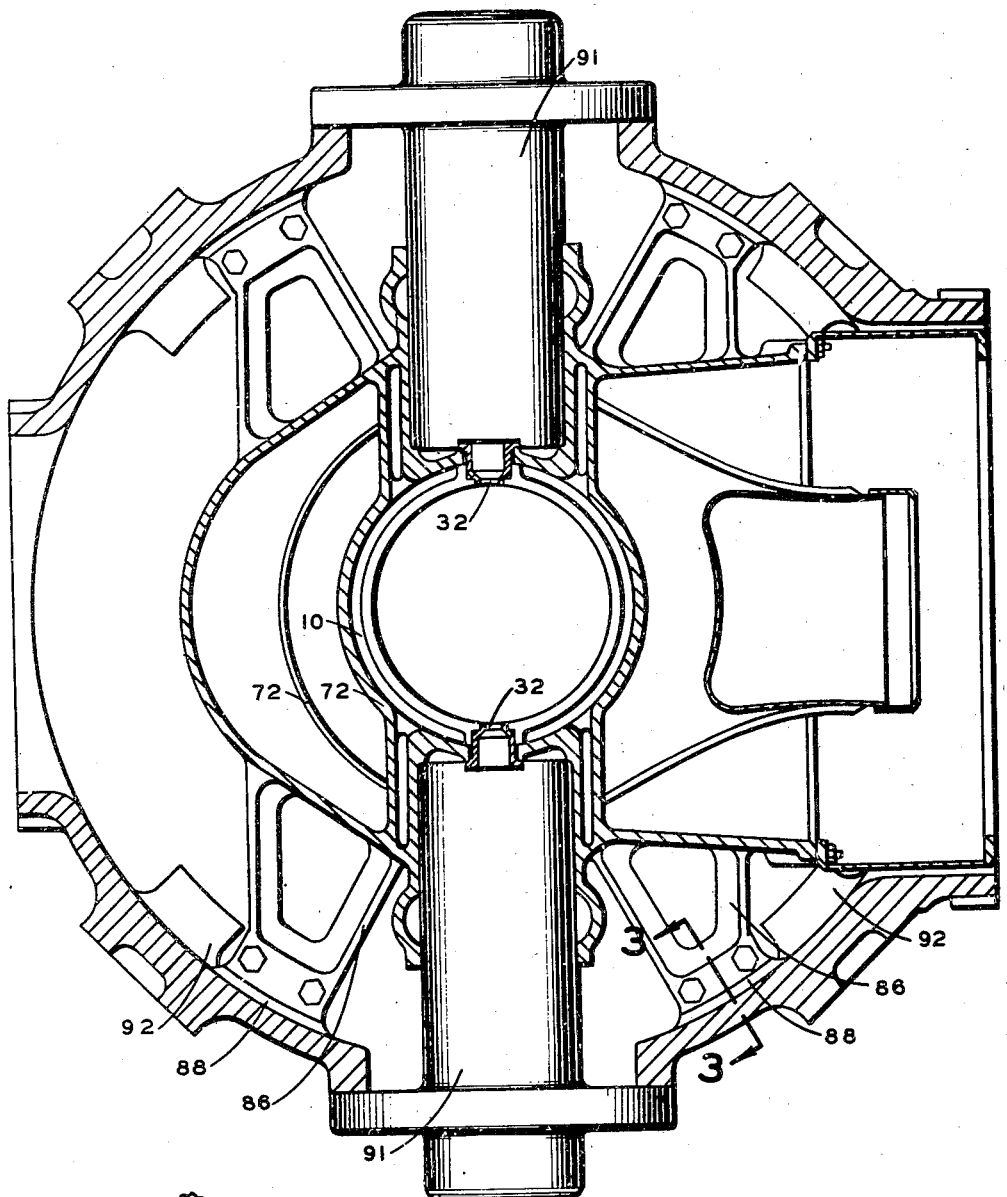
Fig. 2 is a sectional view substantially on line 2—2 of Fig. 1.

The scavenge manifold 48 is made up of a center section 62 and end sections 64 and 66. The end sections may be bolted, as shown in Fig. 1, to the center section, and the outer ends of the end sections have aligning bores 68 and 70 which receive the outer ends of the engine cylinder and maintain alignment of the engine cylinder with the scavenge manifold. As shown in Fig. 2 the center section 62 of the scavenge manifold has, integral therewith, a substantially cylindrical sleeve 72, through which the engine cylinder extends and which, as shown in Fig. 1, aligns the center of the engine cylinder with the ends. The location of the engine cylinder endwise within the scavenge manifold is controlled by clamping rings 74 and 76, Fig. 1, which engage opposite ends of the sleeve 72 to hold the engine cylinder against endwise movement. Ring 74 also clamps a part of the exhaust manifold 60 in position. A ring 78 which may be bolted to the exhaust manifold engages the engine cylinder between scavenge ports 54 and exhaust ports 58.

A projecting sleeve 80 extends from an opening in the scavenge manifold and forms an extension on the manifold. A disk 82 extends between an opening 84 in the intake manifold or housing 42 and the outer end of sleeve 80 to prevent leakage of intake air at this point. This sleeve 80 may be placed on the manifold after the latter has been moved axially into the housing.

Figure 3:
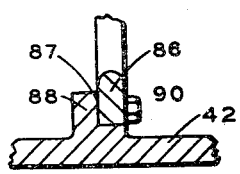
Fig. 3 is a fragmentary sectional view on line 3—3 of Fig. 2.

The center section 72, Fig. 2, of the scavenge manifold has projecting lugs 86 which engage laterally with side surfaces 87 on cooperating lugs 88 on housing 42, and the outer surface of lug 86 engages an internal surface 90, Fig. 3, on each of the lugs 88. In this way, the center section 62 and the entire scavenge manifold are accurately located both axially and laterally within the housing 42, and the manifold in turn accurately locates the engine cylinder both endwise and laterally. Surfaces 87 and 90 may be machined simultaneously for accurate location. The assembly of the scavenge manifold and the engine cylinder may, as will be apparent, be moved endwise through the housing into the assembled position shown. The center section of the scavenge manifold may support injection devices 91.

For locating the outer ends of the engine cylinder accurately within housing 42 the latter has a number of angularly spaced supporting lugs 92 engaging with correspondingly spaced lugs 94 on the end sections 64 and 66 of the scavenge manifold. The inner surfaces of the lugs 92 are internal surfaces which may be machined at the same time that the locating surfaces 90 are machined. The lugs 94 project from vanes 96 integral with the end sections 64 and 66 and project over the intake valves 44.

Also integral with the vanes 96 are rings 98 each having an externally machined surface with which the inner ends of the side walls of the compressor cylinders engage for locating the inner ends of the compressor cylinders accurately within housing 42.

The outer ends of the end walls of compressor cylinders 20 and 22 are supported by end caps 100 and 102 which may be bolted against the ends of the housing 42 and which are accurately located laterally within the housing by internal surfaces 104 and 106 at opposite ends of the housing. Each end cap has an integral ring 108 carried by projecting ribs 110 and having an accurately machined outer surface which fits within the outer end of the wall of the compressor cylinder and accurately locates the outer end of the compressor cylinder with respect to housing 42.

In assembly of the compressor cylinder, the cylinder wall may be bolted or otherwise connected to ring 108 and the end cap and cylinder wall are then slid axially into position within housing 42, the inner end of the cylinder wall sliding over the locating outer surface of ring 98.

Each end cap, which forms a part of the intake manifold, also carries an integral ring 114, the inner surface of which may be accurately machined with respect to the surface of ring 108. Ring 114, which is thus aligned with housing 42, may act to locate accurately the air spring sleeve or cylinder 24 (or 26) which is guided by this ring.

The stationary air spring pistons 28 and 30 are also accurately located with respect to housing 42 since each end cap has an internal surface 116, and an end surface 118 which accurately locate the air spring piston both axially and laterally.

The locating surfaces 104 and 106 may, as will be apparent, be machined in the same set-up or simultaneously with the machining actions on the lugs 92 and 88, and on the end surfaces 120 and 122 with which the end caps engage. In this way, all of the locating surfaces on housing 42 may be finished within extremely close limits. As a result, when the scavenge manifold with the engine cylinder mounted therein is placed within the housing 42, and the compressor cylinders and end caps are in place, the compressor cylinder and engine cylinder will all be in accurate alignment and the rings 114 will accurately locate the air spring sleeves in alignment with the engine and the compressor cylinders.

As above stated, the housing 42 forms the intake manifold for guiding gas to the intake valves at opposite ends of the compressor cylinders. Passages 124 and 126 in end caps 100 and 102 form extensions of the intake manifold for guiding intake air to the valves in the outer ends of the compressor cylinders. The walls for these passages engage the heads of the compressor cylinders between the intake and discharge valves and transmit the gas loads on the compressor heads through the end caps to housing 42. The axial loads on the air spring pistons are transmitted through the end caps to housing 42 and all of the transverse or lateral loads are carried by the housing through the locating structures for the cylinders. Since the housing is kept relatively cool by the flow of intake air over its inner surface, the intake air entering through an opening 128 in the housing, no substantial expansion of the housing will take place to affect the alignment of the parts.

It may be noted that the gas loads on the inner heads of the compressor cylinders are carried by the scavenge manifolds which, as best shown in Fig. 1, forms a substantially straight line connection between the inner compressor heads.

In addition to machining all the locating surfaces in housing 42 simultaneously or in a single set-up of the housing in a machine tool, the other locating elements, such as the end caps or manifold 48, may each have all of its locating surfaces machined in a single set-up of the element in a machine tool for accurately positioning the surfaces with respect to one another.

It is to be understood that the invention is not limited to the specific embodiment herein illustrated and described, but may be used in other ways without departure from its spirit as defined by the following claims.

We claim:

1. A free-piston engine and compressor assembly including a housing, an engine cylinder, a supporting element around said engine cylinder and forming a scavenge manifold for the engine, said housing having centrally positioned locating means in the housing that locate the element axially and laterally and said element engaging said locating means, said element having means for endwise adjustment of the engine cylinder within the element, said element also having means engaging the ends of the engine cylinder, said housing having locating means engaging said element adjacent its ends for aligning the ends of said element with the housing, compressor cylinders at opposite ends of the engine cylinder, the inner ends of the compressor cylinder engaging said element to be aligned with the engine cylinder, and end caps mounted on and engaging locating surfaces on the housing, said caps having locating means for the outer ends of the compressor cylinder.

2. A free-piston engine and compressor assembly including a housing, an engine cylinder, a supporting element around said engine cylinder, said housing having centrally positioned locating means in the housing that locate the element axially and laterally and said element engaging said locating means, said element having means for endwise adjustment of the engine cylinder within the element, said element also having means engaging the ends of the engine cylinder, said housing having locating means engaging said element adjacent its ends for aligning the ends of said element with the housing, compressor cylinders at opposite ends of the engine cylinder, the inner ends of the compressor cylinder engaging said element to be aligned with the engine cylinder, and caps mounted on and engaging locating surfaces on the housing, said caps having locating means for the outer ends of the compressor cylinder, and stationary air spring elements at the outer ends of said compressor cylinder, said air spring elements engaging locating means on said end caps.

3. A free-piston engine and compressor assembly including a housing, an engine cylinder, a supporting element around said engine cylinder, said housing having centrally positioned locating means in the housing that locate the element axially and laterally and said element engaging said locating means, said element having means for endwise adjustment of the engine cylinder within the element, said element also having means engaging the ends of the engine cylinder, said housing having locating means engaging said element adjacent its ends for aligning the ends of said element with the housing, compressor cylinders at opposite ends of the engine cylinder, the inner ends of the compressor cylinder engaging said element to be aligned with the engine cylinder, end caps mounted on and engaging locating surfaces on the housing, said caps having locating means for the outer ends of the compressor cylinder, stationary air spring elements at the outer ends of said compressor cylinder, said elements engaging locating means on said end caps, and piston assemblies each including a movable air spring element, said end caps having aligning surfaces engaging with said movable air spring elements.

ANDREW KALITINSKY.
WALTER A. LEDWITH.

REFERENCES CITED

The following references are of record in the file of this patent:

UNITED STATES PATENTS

| Number | Name | Date |
| --- | --- | --- |
| 1,230,219 | Reall | June 19, 1917 |
| 1,468,282 | Coulombe | Sept. 18, 1923 |
| 1,691,737 | Pescara | Nov. 13, 1928 |
| 1,757,215 | Pescara | May 6, 1930 |
| 1,996,974 | Pescara | Apr. 9, 1935 |
| 2,075,133 | Pescara | Mar. 30, 1937 |
| 2,076,258 | Witkiewicz et al. | Apr. 6, 1937 |
| 2,086,163 | Junkers | July 6, 1937 |
| 2,101,412 | Pescara | Dec. 7, 1937 |
| 2,108,890 | Janicke | Feb. 22, 1938 |